United States Patent
Naito et al.

(10) Patent No.: US 11,424,473 B2
(45) Date of Patent: Aug. 23, 2022

(54) FUEL CELL STACK WITH SUPPORT BAR

(71) Applicant: HONDA MOTOR CO., LTD., Tokyo (JP)

(72) Inventors: Hideharu Naito, Wako (JP); Kosuke Takagi, Wako (JP); Satoshi Kasagami, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 240 days.

(21) Appl. No.: 16/794,270

(22) Filed: Feb. 19, 2020

(65) Prior Publication Data

US 2020/0274183 A1 Aug. 27, 2020

(30) Foreign Application Priority Data

Feb. 21, 2019 (JP) ............................. JP2019-029287

(51) Int. Cl.
*H01M 8/2475* (2016.01)

(52) U.S. Cl.
CPC ................................. *H01M 8/2475* (2013.01)

(58) Field of Classification Search
CPC .. H01M 8/2465; H01M 8/247; H01M 8/2475; H01M 8/248; H01M 8/2483; H01M 8/2484; H01M 8/2485; H01M 8/24; H01M 8/2404; H01M 50/291; H01M 50/20; H01M 50/233; H01M 50/244
See application file for complete search history.

(56) References Cited

U.S. PATENT DOCUMENTS

| | | | |
|---|---|---|---|
| 2006/0199067 A1* | 9/2006 | Barbir | H01M 8/248 429/511 |
| 2007/0231619 A1* | 10/2007 | Strobel | H01M 8/2457 429/534 |
| 2012/0040226 A1* | 2/2012 | Kim | H01M 50/20 429/158 |
| 2014/0162161 A1* | 6/2014 | Hood | H01M 8/0269 439/726 |
| 2014/0162168 A1* | 6/2014 | Heo | H01M 8/2483 429/469 |
| 2014/0227625 A1* | 8/2014 | Karmazyn | H01M 8/0273 429/482 |
| 2015/0207127 A1* | 7/2015 | Davis | H01M 50/502 429/90 |
| 2015/0214534 A1* | 7/2015 | Callicoat | H01M 50/502 228/180.5 |

(Continued)

FOREIGN PATENT DOCUMENTS

JP 2016-143545 8/2016

*Primary Examiner* — Imran Akram
(74) *Attorney, Agent, or Firm* — Amin, Turocy & Watson, LLP (57) ABSTRACT

A fuel cell stack includes a stack body formed by stacking a plurality of power generation cells together in a stacking direction, the power generation cells each having a separator, and a pair of end plates provided at both ends of the stack body in the stacking direction. Further, the fuel cell stack includes a support bar extending between the pair of end plates in the stacking direction and configured to engage with an outer peripheral portion of the separator. The width of the support bar is decreased gradually from one end and the other end toward a central portion in an extension direction in which the support bar extends.

4 Claims, 5 Drawing Sheets

(56) References Cited

U.S. PATENT DOCUMENTS

| | | |
|---|---|---|
| 2016/0226092 A1 | 8/2016 | Nishiyama et al. |
| 2016/0240881 A1* | 8/2016 | Sang .................... H01M 8/248 |
| 2017/0040585 A1* | 2/2017 | Park .................... H01M 50/502 |
| 2018/0241062 A1* | 8/2018 | Koi .................... H01M 8/0219 |

* cited by examiner

FUEL CELL STACK WITH SUPPORT BAR

CROSS-REFERENCE TO RELATED APPLICATION

This application is based upon and claims the benefit of priority from Japanese Patent Application No. 2019-029287 filed on Feb. 21, 2019, the contents of which are incorporated herein by reference.

BACKGROUND OF THE INVENTION

Field of the Invention

The present invention relates to a fuel cell stack formed by stacking a plurality of power generation cells together.

Description of the Related Art

As described in Japanese Laid-Open Patent Publication No. 2016-143545, the fuel cell stack includes a stack body formed by stacking a plurality of power generation cells together for performing power generation consuming a fuel gas and an oxygen-containing gas, and a stack case containing the stack body. Each of the power generation cells includes a membrane electrode assembly (MEA) and a pair of separators sandwiching the MEA. The MEA is formed by stacking an anode, an electrolyte membrane, and a cathode together. The separators are bipolar plates.

Further, the separator disclosed in Japanese Laid-Open Patent Publication No. 2016-143545 includes tabs which protrude outward, in its outer peripheral portion. The tabs are accommodated in recesses of coupling members (support bars) extending in a stacking direction of the stack body, in the stack case. In the structure, when the vehicle receives an impact and the fuel cell stack is consequently subjected to a load of the impact, the tabs are brought into engagement with the support bars, so that positional displacement among the separators is prevented.

SUMMARY OF THE INVENTION

The present invention has been made in relation to the technique as described above, and an object of the present invention is to provide a fuel cell stack in which it is possible to receive and support a load of a separator by a support bar even more suitably.

In order to achieve the above object, according to an aspect of the present invention, a fuel cell stack is provided. The fuel cell stack includes a stack body including a plurality of power generation cells stacked together in a stacking direction, the power generation cells each having a separator, a pair of end plates provided at both ends of the stack body in the stacking direction, and a support bar extending between the pair of end plates in the stacking direction and configured to engage with an outer peripheral portion of the separator. The width of the support bar is decreased gradually from both ends toward a central portion in an extension direction in which the support bar extends.

In the fuel cell stack, the width of the support bar is decreased gradually from both ends toward the central portion in the extension direction. In the structure, it is possible to gradually reduce the rigidity of the support bar from both ends toward the central portion in the extension direction. Thus, the support bar tends to be deformed easily at around its central portion. Therefore, when the fuel cell stack receives an impact load, since deformation of the central portion of the support bar easily follows movement of the power generation cells around the center of the stack body in the stacking direction, it is possible to reduce stress concentration on the central portion of the support bar, and receive the impact load even more suitably. Further, since weight reduction of the support bar is achieved, it is possible to facilitate weight reduction of the fuel cell stack as a whole.

The above and other objects features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Hereinafter, a preferred embodiment of the present invention will be described in detail with reference to the accompanying drawings.

Figure 1:
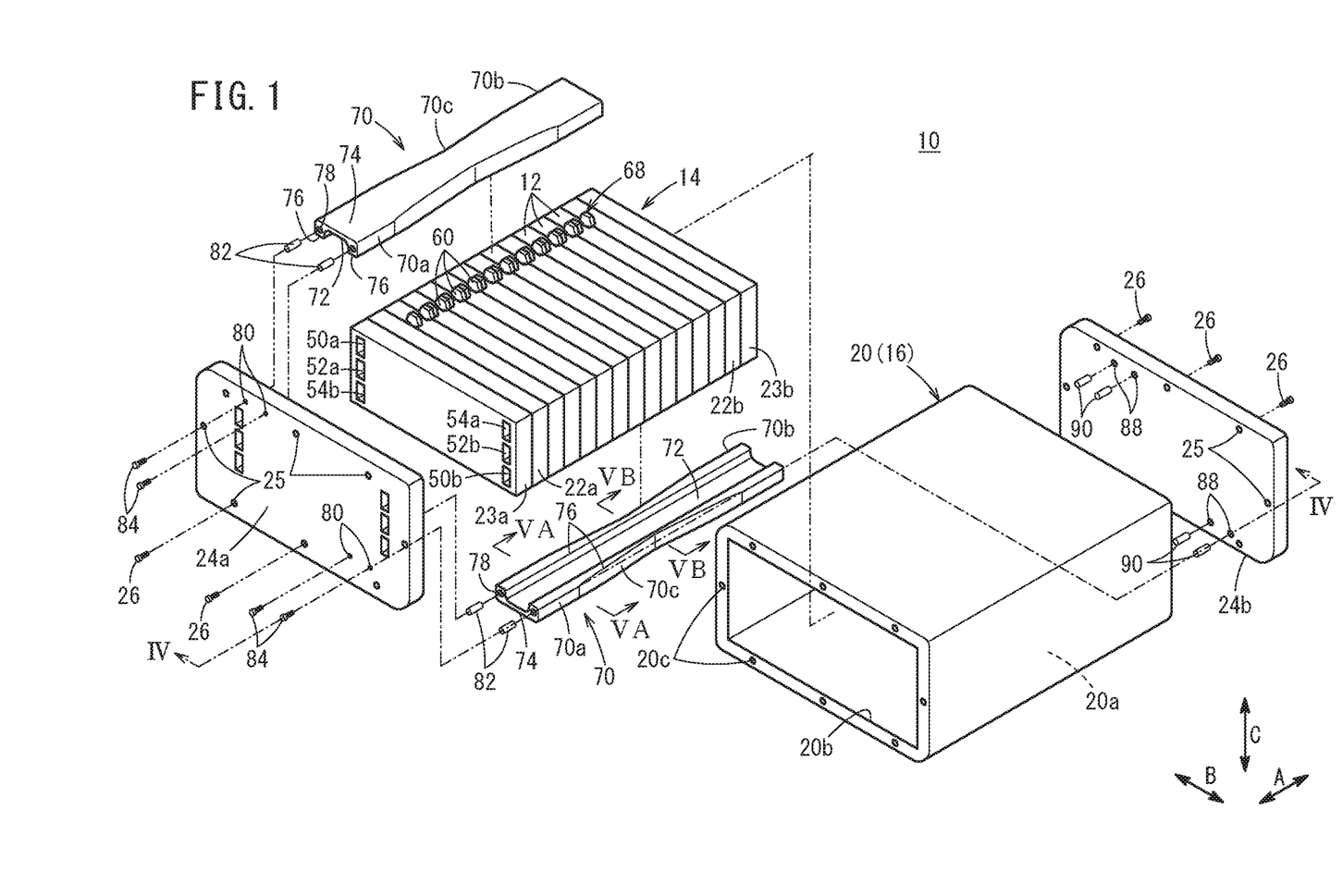
FIG. 1 is an exploded perspective view showing overall structure of a fuel cell stack according to an embodiment of the present invention.

As shown in FIG. 1, a fuel cell stack 10 according to an embodiment of the present invention includes a plurality of power generation cells 12 as units of fuel cells. The plurality of power generation cells 12 are stacked together in a horizontal direction indicated by an arrow A to form a stack body 14. In use, for example, the fuel cell stack 10 is mounted in a fuel cell automobile (not shown). It should be noted that, in the state where the stack body 14 is mounted in the fuel cell automobile, the plurality of power generation cells 12 may be stacked together in the gravity direction indicated by an arrow C.

For the purpose of mounting the stack body 14 in the fuel cell automobile, the fuel cell stack 10 includes a stack case 16 containing the stack body 14. Further, pipes, auxiliary devices (devices), etc. for a fuel cell system (not shown) including the fuel cell stack 10 are coupled to one end of the stack case 16.

The stack case 16 includes a rectangular cylindrical case body 20 having a storage space 20a, and a pair of end plates 24a, 24b for closing both ends of the case body 20. The case body 20 is in the form of a one-piece structural object including a ceiling plate, a pair of side plates, and a bottom plate that are formed integrally by extrusion processing, casting, etc. Open sections 20b communicating with the storage space 20a are provided at both ends of the case body 20 in an axial direction indicated by the arrow A. A plurality of body side screw holes 20c are formed in both end surfaces of the case body 20 around the open sections 20b. The case body 20 may be formed by joining a ceiling plate, a pair of side plates, and a bottom plate as separate component parts, together.

In the storage space 20a, at one end of the plurality of power generation cells 12 in the stacking direction indicated by the arrow A, a terminal plate 22a is disposed. An insulator 23a is disposed outside the terminal plate 22a. At the other end of the plurality of power generation cells 12 in the stacking direction, a terminal plate 22b is disposed. An insulator 23b is disposed outside the terminal plate 22b.

Then, an end plate 24a is disposed at one end, in the stacking direction, of the stack body 14 including the terminal plate 22a and the insulator 23a. An end plate 24b is disposed at the other end, in the stacking direction, of the stack body 14 including the terminal plate 22b and the insulator 23b.

A plurality of fastening holes 25 are provided in each of the pair of end plates 24a, 24b. The plurality of fastening holes 25 face the plurality of body side screw holes 20c of the case body 20. At the time of assembling the fuel cell stack 10, bolts 26 are inserted through the fastening holes 25, and screwed with the body side screw holes 20c. Thus, the end plates 24a, 24b are fixed to the case body 20. At the time of assembling the fuel cell stack 10, seal members 27 (see FIG. 4) for preventing leakage of gases are disposed between the case body 20 and the end plates 24a, 24b.

In the fuel cell stack 10 having the above structure, the stack body 14 is held between the pair of end plates 24a, 24b such that a tightening load in the stacking direction indicated by the arrow A is applied from the case body 20 to the stack body 14 through the pair of end plates 24a, 24b. For example, adjustment of the tightening load is made by adjusting the thickness of the insulators 23a, 23b or determining the layout of shims whose thicknesses are adjusted. By this tightening load, in the plurality of power generation cells 12 which form the stack body 14, leakage, etc. of reactant gasses during power generation is suppressed, and a suitable surface pressure is applied to power generation surfaces of the power generation cells 12.

Figure 2:
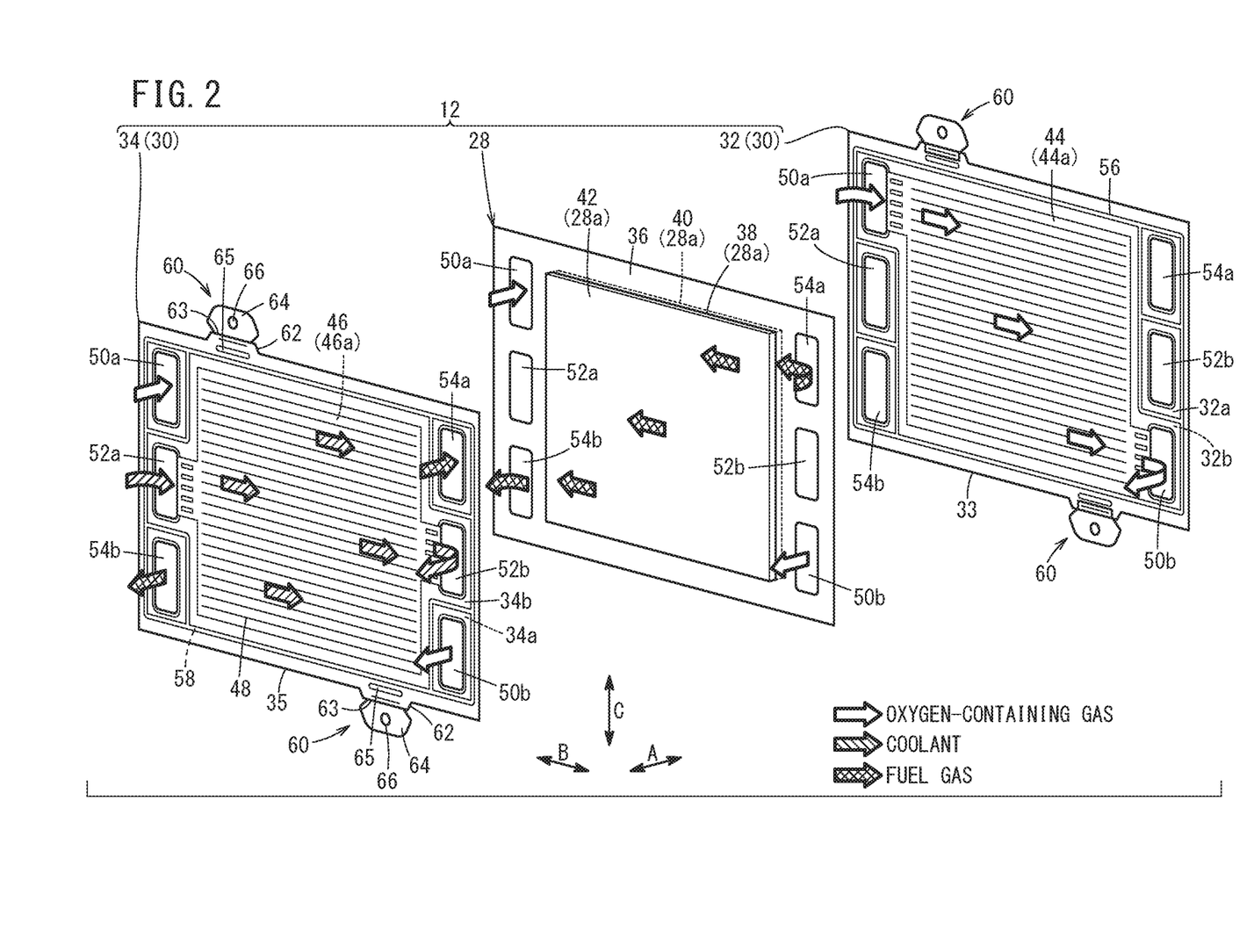
FIG. 2 is an exploded perspective view showing structure of a power generation cell of a fuel cell stack.

As shown in FIG. 2, the power generation cell 12 of the fuel cell stack 10 includes a resin frame equipped MEA 28, and a pair of separators 32, 34 sandwiching the resin frame equipped MEA 28 (hereinafter the two separators 32, 34, will also be referred to as the "separators 30", collectively). Specifically, the power generation cell 12 includes a first separator 32 disposed on one surface of the resin frame equipped MEA 28, and a second separator 34 disposed on the other surface of the resin frame equipped MEA 28.

The resin frame equipped MEA 28 of the power generation cell 12 includes a membrane electrode assembly 28a (hereafter referred to as the "MEA 28a") and a resin frame member 36 joined to an outer peripheral portion of the MEA 28a, and provided around the outer peripheral portion of the MEA 28a. Further, the MEA 28a includes an electrolyte membrane 38, a cathode 40 provided on one surface of the electrolyte membrane 38, and an anode 42 provided on the other surface of the electrolyte membrane 38. It should be noted that the resin frame member 36 need not necessarily be provided for the MEA 28a, and the electrolyte membrane 38 may protrude outward without using the resin frame member 36. A frame shaped film member may be used as the resin frame member 36.

For example, the electrolyte membrane 38 is a solid polymer electrolyte membrane (cation ion exchange membrane) which is a thin membrane of perfluorosulfonic acid containing water. A fluorine based electrolyte may be used as the electrolyte membrane 38. Alternatively, an HC (hydrocarbon) based electrolyte may be used as the electrolyte membrane 38. Further, though not shown, each of the anode 42 and the cathode 40 includes a gas diffusion layer comprising a carbon paper, etc., and an electrode catalyst layer joined to the electrolyte membrane 38. The electrode catalyst layer is formed by paste containing porous carbon particles and ion exchange component deposited uniformly on the surface of the gas diffusion layer, and platinum alloy supported on the surfaces of the porous carbon particles.

The resin frame member 36 is provided around the MEA 28a to facilitate cost reduction of the electrolyte membrane 38, and suitably adjust the contact pressure between the MEA 28a and the first and second separators 32, 34 to achieve the desired sealing performance. For example, the resin frame member 36 is made of PPS (polyphenylene sulfide), PPA (polyphthalamide), PEN (polyethylene naphthalate), PES (polyethersulfone), LCP (liquid crystal polymer), PVDF (polyvinylidene fluoride), a silicone resin, a fluororesin, m-PPE (modified polyphenylene ether) resin, PET (polyethylene terephthalate), PBT (polybutylene terephthalate), or modified polyolefin.

The first separator 32 includes an oxygen-containing gas flow field 44 on a surface 32a thereof facing the cathode 40 of the resin frame equipped MEA 28, for allowing an oxygen-containing gas as one of reactant gases to flow along the oxygen-containing gas flow field 44. The oxygen-containing gas flow field 44 comprises straight flow grooves or wavy flow grooves formed between a plurality of ridges 44a extending along the first separator 32 in the direction indicated by the arrow B.

The second separator 34 includes a fuel gas flow field 46 on its surface 34a facing the anode 42 of the resin frame equipped MEA 28, for allowing a fuel gas as the other of the reactant gases to flow along the fuel gas flow field 46 (in FIG. 2, for convenience, the flow direction of the fuel gas is shown on the anode 42 of the MEA 28a). The fuel gas flow field 46 includes a plurality of straight flow grooves or wavy flow grooves formed between a plurality of ridges 46a extending along the second separator 34 in the direction indicated by the arrow B.

Further, a coolant flow field 48 is provided between a surface 32b of the first separator 32 and a surface 34b of the second separator 34 that are stacked together, for allowing a coolant (e.g., water) to flow along the coolant flow field 48. When the first separator 32 and the second separator 34 are stacked together, the coolant flow field 48 is formed between the back surface of the oxygen-containing gas flow field 44 of the first separator 32 and the back surface of the fuel gas flow field 46 of the second separator 34.

At one end of the first and second separator 32, 34, and the resin frame member 36 in the longitudinal direction (indicated by the arrow B), an oxygen-containing gas supply passage 50a, a coolant supply passage 52a, and a fuel gas discharge passage 54b are provided, respectively. The oxygen-containing gas supply passage 50a, the coolant supply passage 52a, and the fuel gas discharge passage 54b extend through the first and second separators 32, 34 and the resin frame member 36 in the stacking direction indicated by the arrow A. The oxygen-containing gas supply passage 50a, the coolant supply passage 52a and the fuel gas discharge passage 54b are arranged in the lateral direction indicated by the arrow C. The oxygen-containing gas is supplied through the oxygen-containing gas supply passage 50a to the oxygen-containing gas flow field 44. The coolant is supplied through the coolant supply passage 52a to the coolant flow field 48. The fuel gas is discharged from the fuel gas flow field 46 through the fuel gas discharge passage 54b.

At the other end of the first and second separators 32, 34 and the resin frame member 36 in the longitudinal direction indicated by the arrow B, a fuel gas supply passage 54a, a coolant discharge passage 52b, and an oxygen-containing gas discharge passage 50b are provided. The fuel gas supply passage 54a, the coolant discharge passage 52b, and the oxygen-containing gas discharge passage 50b extend through the first and second separators 32, 34 and the resin frame member 36 in the stacking direction. The fuel gas supply passage 54a, the coolant discharge passage 52b, and the oxygen-containing gas discharge passage 50b are arranged in the lateral direction indicated by the arrow C. The fuel gas is supplied to the fuel gas flow field 46 through the fuel gas supply passage 54a. The coolant is discharged from the coolant flow field 48 through the coolant discharge passage 52b. The oxygen-containing gas is discharged from the oxygen-containing gas flow field 44 through the oxygen-containing gas discharge passage 50b.

The oxygen-containing gas supply passage 50a, the oxygen-containing gas discharge passage 50b, the fuel gas supply passage 54a, the fuel gas discharge passage 54b, the coolant supply passage 52a, and the coolant discharge passage 52b penetrate through the structure part (the terminal plate 22a, the insulator 23a, the end plate 24a) at one end of the stack body 14 in the stacking direction, and are connected to pipes (not shown) connected to the end plate 24a. The layout and the shapes of the oxygen-containing gas supply passage 50a, the oxygen-containing gas discharge passage 50b, the fuel gas supply passage 54a, the fuel gas discharge passage 54b, the coolant supply passage 52a, and the coolant discharge passage 52b are not limited to the illustrated embodiment, and may be changed as necessary depending on the required specification of the fuel cell stack 10.

Further, a first bead 56 is formed on the surface 32a of the first separator 32 by press forming. The first bead 56 protrudes toward the resin frame equipped MEA 28, and contacts the resin frame member 36 to form a seal (bead seal). The first bead 56 is formed around the oxygen-containing gas flow field 44, and surrounds the fuel gas supply passage 54a, the fuel gas discharge passage 54b, the coolant supply passage 52a, and the coolant discharge passage 52b, respectively, to prevent flow of the fuel gas and/or the coolant into the oxygen-containing gas flow field 44.

A second bead 58 is formed on the surface 34a of the second separator 34 by press forming. The second bead 58 protrudes toward the resin frame equipped MEA 28, and contacts the resin frame member 36 to form a seal (bead seal). The second bead 58 is formed around the fuel gas flow field 46, and surrounds the oxygen-containing gas supply passage 50a, the oxygen-containing gas discharge passage 50b, the coolant supply passage 52a, and the coolant discharge passage 52b, respectively, to prevent flow of the oxygen-containing gas and/or the coolant into the fuel gas flow field 46.

Each of the separators 30 (first and second separators 32, 34) is an electrically conductive metal separator formed by press forming of, e.g., a steel plate, a stainless steel plate, an aluminum plate, a plated steel plate, or a metal thin plate having an anti-corrosive surface by surface treatment to have a corrugated shape in cross section. It should be noted that as the separators 30, carbon separators made of carbon material or mixed material of carbon and resin may be used. Further, insulating resin material may be provided in outer peripheral portions 33, 35 of the first and second separators 32, 34. Moreover, instead of the bead seals, elastic rubber seals may be provided on the first and second separators 32, 34.

The first separator 32 and the second separator 34 are joined together by a joining method such as welding, brazing, crimping, etc. to form a joint separator. At the time of producing the plurality of power generation cells 12, the joint separators and the resin frame equipped MEAs 28 are stacked together alternately, to form the stack body 14. As a result, the stack body 14 has structure of repeating the oxygen-containing gas flow field 44 between the first separator 32 and the resin frame equipped MEA 28, the fuel gas flow field 46 between the resin frame equipped MEA 28 and the second separator 34, and the coolant flow field 48 between the first separator 32 and the second separator 34 in this order.

Further, as shown in FIGS. 1 and 2, a plurality of tabs (protrusion pieces) 60 (e.g., a pair of tabs 60) are provided in the outer peripheral portions 33, 35 of the separators 30 (first and second separators 32, 34) of the power generation cells 12, respectively. The plurality of tabs 60 are provided on the upper side and the lower side (long sides) of the first and second separators 32, 34. The tab 60 on the upper side is provided at a position shifted toward the other side from the center in the direction indicated by the arrow B, and the tab 60 on the lower side is provided at a position shifted toward one side from the center in the direction indicated by the arrow B. It should be noted that the positions of the tabs 60 in the outer peripheral portions 33, 35 are not limited specially. Further, the tabs 60 may be provided only on one of the separators 30, while the tabs 60 on the other of the separators 30 may be omitted.

Each of the tabs 60 includes a support 62, a load receiver 64, and a rib 65. The support 62 has a trapezoidal shape, and the support 62 is formed integrally with the outer peripheral portion 33, 35 of the separator 30 by press forming, in a manner to protrude outward from the outer peripheral portion 33, 35 in the direction indicated by the arrow C). The rib 65 is formed in the support 62. The rib 65 protrudes in the stacking direction, and extends in the width direction of the support 62 (indicated by the arrow B).

The load receiver 64 is joined to the support 62 through a joint part 63. Each of both ends of the load receiver 64 in the width direction has a substantially triangular shape, and has a symmetrical shape about the central line in the width direction (indicated by the arrow B). A positioning hole 66 is formed at the center of the load receiver 64. A rod (not shown) is inserted into the positioning hole 66, for positioning the plurality of power generation cells 12 at the time of producing the fuel cell stack 10.

The load receiver 64 comprises a metal thin plate, and the outer portion of the load receiver 64 and the inner circumferential portion of the positioning hole 66 are made of insulating resin material. As long as the resin material of the load receiver 64 has electrically insulating performance, the resin material is not limited specially. For example, polycarbonate, polyphenylene sulfide, polysulfone, fluororesin, or the same material as that used for the insulators 23a, 23b may be used. It should be noted that the structure of the tab 60 is not limited specially. For example, the support 62 and the load receiver 64 may be formed integrally with each other. The load receiver 64 may have any shape such as a rectangular shape, a trapezoidal shape, etc. The load receiver 64 is joined to the support 62 by brazing, welding, etc.

As shown in FIG. 1, in the state where the plurality of power generation cells 12 (separators 30) are stacked together, the tabs 60 are arranged in one line to form a tab array 68 along the direction of arrow A. In the embodiment of the present invention, the tab array 68 is arranged on each of an upper surface and a lower surface (in the outer periphery) of the stack body 14. The fuel cell stack 10 includes support bars 70 each having a recess 72 configured to accommodate the tab array 68 (plurality of tabs 60). The support bar 70 is configured to engage with the outer peripheral portions 33, 35 of the separator 30.

Figure 3A:
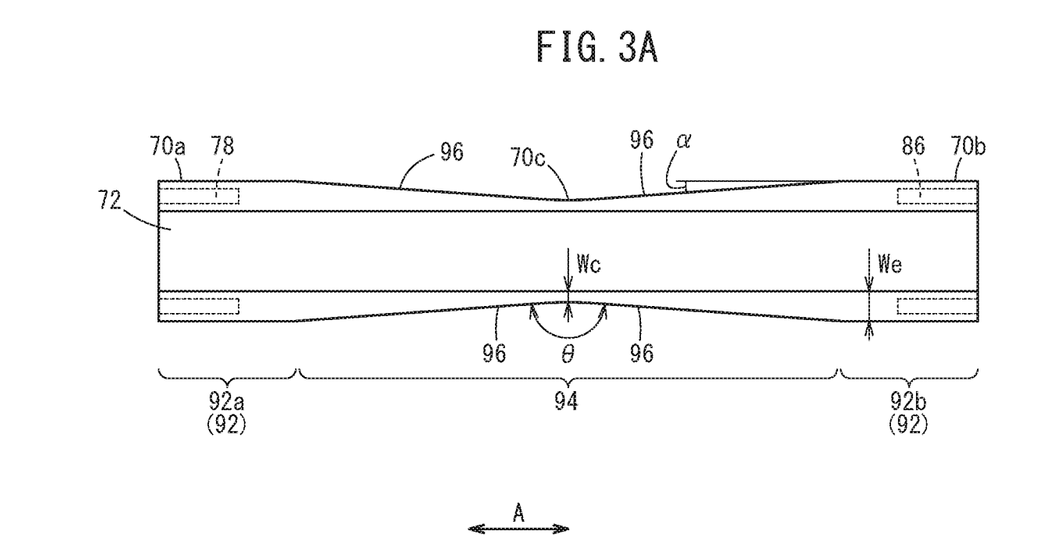
FIG. 3A is a plan view showing a support bar.
Figure 3B:
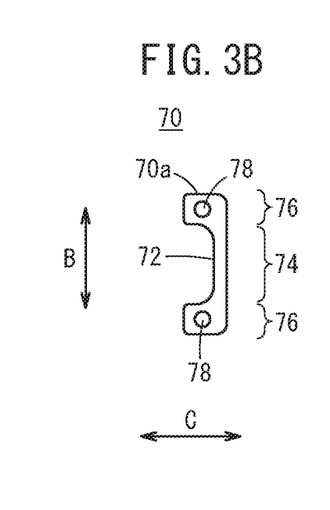
FIG. 3B is an arrow view where the support bar is viewed in a direction indicated by an arrow A.

As shown in FIGS. 1, 3A, and 3B, the support bar 70 is provided in correspondence with each of the tab arrays 68. That is, one support bar 70 is provided in each of the pair of long sides (the upper side and the lower side positioned in the direction indicated by the arrow C), among the four sides of the rectangular separator 30. It should be noted that the positions where the tabs 60 and the support bars 70 are provided may be determined optionally in correspondence with the direction in which the fuel cell automobile receive the load. For example, the support bar 70 may be provided only on one of the pair of long sides of the separator 30. Alternatively, in the case the upper side and the lower side of the separator 30 are short sides, the support bars 70 may be provided on the short sides, respectively. Further, the support bars 70 may be provided on all of the four sides of the separator 30, respectively. Further, a plurality of the support bars 70 may be provided on one side of the separator 30.

The entire length of the support bar 70 is substantially the same as the length of the case body 20 in the direction indicated by the arrow A (stacking direction of the power generation cells 12). The support bar 70 includes the recess 72 for accommodating the tab array 68 (the tabs 60 of the separators 30), on its surface facing the stack body 14. The recess 72 is a laterally elongated groove having rounded corners of the bottom in a cross sectional view. The recess 72 includes a bottom portion 74 and a pair of side portions 76, of the support bar 70. The recess 72 is formed over the entire length of the support bar 70 in an extension direction in which the support bar 70 extends (in the direction indicated by the arrow A).

The material of the support bar 70 is not limited specially as along as the support bar 70 has suitable rigidity which makes it possible to receive the load in the width direction (indicated by the arrow B) of the tabs 60. For example, metal material such as aluminum, iron, and titanium may be used as material of the support bar 70. It should be noted that the support bar 70 may be made of insulating resin material, or formed by coating a metal body with an insulating resin member. In this case, the tab 60 may be made of only metal material without coating the outer periphery of the tab 60 with resin material.

Figure 4:
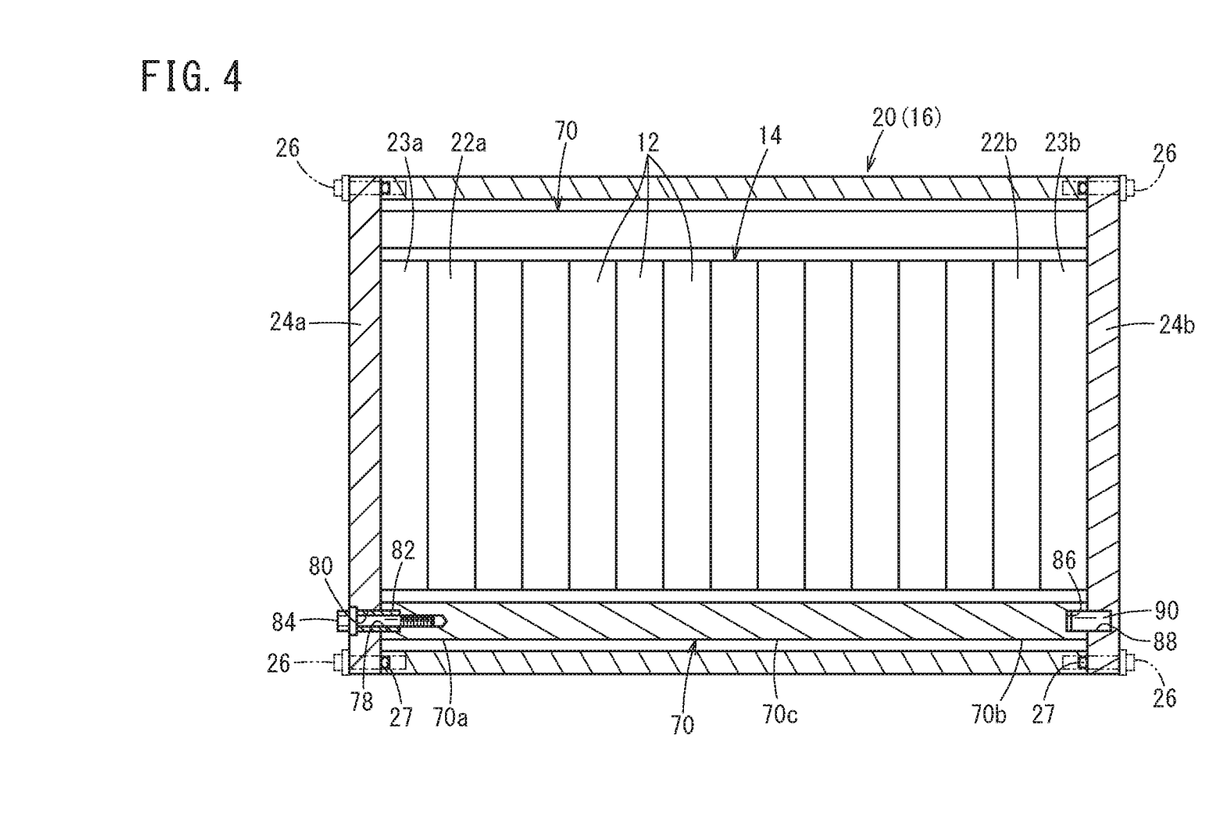
FIG. 4 is a side cross sectional view schematically showing a position corresponding to a line IV-IV in FIG. 1 in a fuel cell stack having the support bar.

Further, as shown in FIG. 4, in the embodiment of the present invention, one end 70*a* of the support bar 70 in the stacking direction of the stack body 14 is joined to the end plate 24*a*. On the other hand, the other end 70*b* of the support bar 70 in the stacking direction of the stack body 14 is supported by the end plate 24*b* in a manner that no tightening load is applied. That is, the fuel cell stack 10 has structure where no tightening load is applied from the support bar 70 to the stack body 14.

Specifically, a pair of joining holes 78 are formed at one end 70*a* of the support bar 70, and a pair of holes 80 are formed in the end plate 24*a*, in correspondence with the joining holes 78. Then, a pair of hollow knock pins 82 and a pair of fastening bolts 84 are inserted into the pair of joining holes 78 and the pair of holes 80, and male screw portions at front ends of the fastening bolts 84 in the insertion direction are screwed with female screw portions of the joining holes 78. In this manner, one end 70*a* of the support bar 70 and the end plate 24*a* are fastened together firmly. It should be noted that the number of the fastening bolts 84 (and the joining holes 78) provided at one end 70*a* of the support bar 70 is not limited to two.

Further, a pair of first holes 86 are formed at the other end 70*b* of the support bar 70, and a pair of second holes 88 are formed in the end plate 24*b*, in correspondence with the first holes 86. The first hole 86 and the second hole 88 face each other to form a closed space. Then, a pair of solid pins 90 (or hollow pins) are inserted into the pair of first holes 86 and the pair of second holes 88. Thus, the other end 70*b* of the support bar 70 is supported by the end plate 24*b* without applying the tightening load to the stack body 14. Minute clearance is formed between an end surface of the other end 70*b* of the support bar 70 supported by the solid pin 90 and the end plate 24*b*. In the specification, the "support(ing)" herein means that the support bar 70 is movable in the axial direction of the solid pin 90, but unmovable in the radial direction thereof.

Further, in a plan view shown in FIG. 3A, the support bar 70 according to the embodiment of the present invention includes wide portions 92 (wide portions 92*a*, 92*b*) at both ends (one end 70*a* and the other end 70*b*), and a width changing portion 94 disposed between the pair of wide portions 92 so as to be continuous with the pair of wide portions 92.

In the wide portion 92, the thickness, in the direction of arrow B, of the pair of side portions 76 surrounding the recess 72 is large. As a result, the entire width of the wide portion 92 in the direction indicated by the arrow B is larger. The width of the wide portion 92 in the direction of the arrow B is constant along the direction of the arrow A. In the support bar 70, an area (a length in the direction of arrow A) where the wide portion 92 is formed is determined so as to correspond to the range of about ⅒ to ⅓ of the entire length of the support bar 70, for example.

Figure 5A:
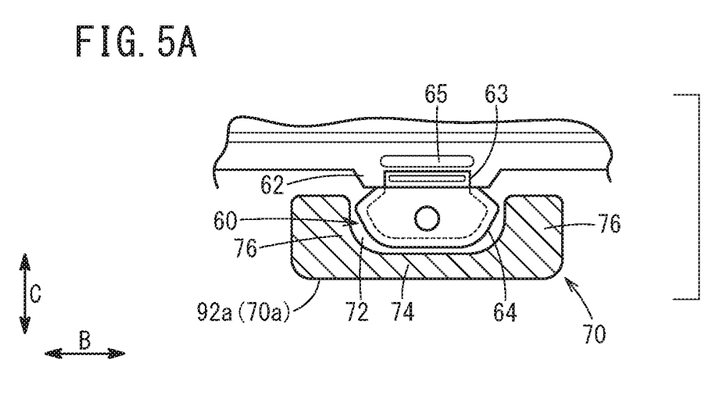
FIG. 5A is a cross sectional view showing the support bar and a tab at a position corresponding to a line VA-VA in FIG. 1.

The pair of wide portions 92 accommodate the tabs 60 (tab array 68) at and near both ends of the stack body 14 in the stacking direction, in a cross sectional view along the direction indicated by the arrow B, of the support bar 70 shown in FIG. 5A. Further, the pair of joining holes 78 are formed in the wide portions 92*a* (pair of side portions 76) closer to one end 70*a*. That is, the wide portions 92*a* form fastening structure for fastening the support bar to the end plate 24*a*. Further, the pair of first holes 86 are formed inside the wide portions 92*b* (the pair of side portions 76) closer to the other end 70*b*. That is, the wide portions 92*b* form support structure supported by the end plate 24*b*.

On the other hand, the width changing portion 94 has a constriction shape where the width in the direction indicated by the arrow B is narrowed gradually from the pair of wide portions 92*a*, 92*b* toward a central portion 70*c* of the support bar 70 in the direction indicated by the arrow A. That is, a pair of inclined surfaces 96 are formed on both sides of the width changing portion 94 in the direction indicated by the arrow B, respectively, and the inclined surfaces 96 are inclined inward in the width direction toward the central portion 70*c*.

The pair of inclined surfaces 96 extend straight and smoothly. Further, a large angle θ which is slightly smaller than 180° is formed at the central portion 70*c*. The inclined surface 96 need not necessarily extend straight. The inclined surface 96 may extend in a curved manner. The inclined angle α at which the inclined surface 96 is inclined from the wide portions 92*a*, 92*b* is not limited specially. For example, it is preferable that the inclined angle α at which the inclined surface 96 is inclined from the side surfaces of the wide portions 92 is set within the range of 1° to 10°. The shape of the recess 72 in the width changing portion 94 is constant, and the thickness of the side portions 76 in the direction indicated by the arrow B changes. For example, preferably, the thickness We of each side portion 76 at the central portion 70c (width changing portion 94) of the direction of arrow A is determined to be about ½ or less of the thickness We of each of the side portions 76 at both ends (wide portions 92a, 92b) in the direction of arrow A.

Figure 5B:
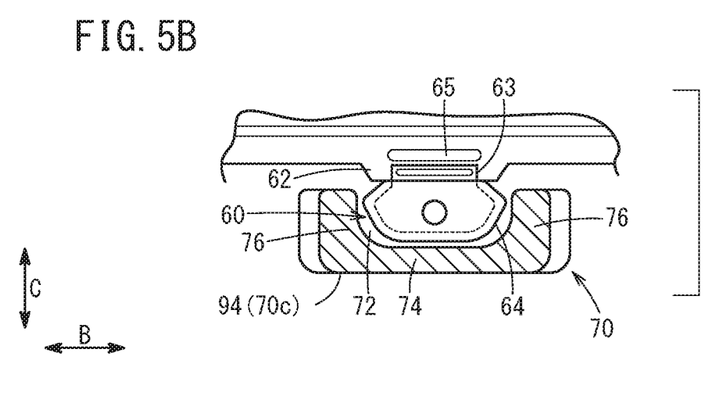
FIG. 5B is a cross sectional view showing the support bar and a tab at a position corresponding to a line VB-VB in FIG. 1.

In a cross sectional view of the support bar 70 along the direction indicated by the arrow B as shown in FIG. 5B, the recess 72 at and near the central portion 70c of the width changing portion 94 accommodates the tabs 60 (tab array 68) of a plurality of power generation cells 12 located at the central portion in the stacking direction, among the power generation cells 12 of the stack body 14. In the width changing portion 94, the shape of the recess 72 does not change, and only the outer shape of the width changing portion 94 has a constriction shape defined by the inclined surfaces 96. Therefore, the rigidity of the support bar 70 is gradually decreased from both ends (wide portions 92) toward the central portion 70c.

The fuel cell stack 10 according to the embodiment of the present invention basically has the above structure. Next, operation of the fuel cell stack 10 will be described.

As shown in FIGS. 1 and 2, in the fuel cell stack 10, an oxygen-containing gas is supplied to the oxygen-containing gas supply passage 50a, a fuel gas is supplied to the fuel gas supply passage 54a, and a coolant is supplied to the coolant supply passage 52a through pipes (not shown) coupled to the end plate 24a to perform power generation.

The oxygen-containing gas is supplied from the oxygen-containing gas supply passage 50a to the oxygen-containing gas flow field 44 of the first separator 32. The oxygen-containing gas flows along the oxygen-containing gas flow field 44 in the direction indicated by the arrow B, and the oxygen-containing gas is supplied to the cathode 40 of the MEA 28a.

In the meanwhile, the fuel gas flows from the fuel gas supply passage 54a into the fuel gas flow field 46 of the second separator 34. The fuel gas flows along the fuel gas flow field 46 in the direction indicated by the arrow B, and the fuel gas is supplied to the anode 42 of the MEA 28a.

In each of the MEAs 28a, power generation is performed by electrochemical reactions of the oxygen-containing gas supplied to the cathode 40 and the fuel gas supplied to the anode 42. The oxygen-containing gas supplied to the cathode 40 is partially consumed at the cathode 40, and then, flows from the oxygen-containing gas flow field 44 to the oxygen-containing gas discharge passage 50b. The oxygen-containing gas is discharged along the oxygen-containing gas discharge passage 50b. Likewise, the fuel gas supplied to the anode 42 is partially consumed at the anode 42, and then, flows from the fuel gas flow field 46 to the fuel gas discharge passage 54b. The fuel gas is discharged along the fuel gas discharge passage 54b.

Further, the coolant supplied to the coolant supply passage 52a flows into the coolant flow field 48 formed between the first separator 32 and the second separator 34, and then, the coolant flows in the direction indicated by the arrow B. After the coolant cools the MEA 28a, the coolant is discharged from the coolant discharge passage 52b.

Then, as shown in FIGS. 1, 5A, and 5B, in the fuel cell stack 10, the tab 60 of each of the power generation cells 12 is disposed in the recess 72 of the support bar 70. In the structure, for example, even if the fuel cell automobile receives an impact from the front side (in the direction indicated by the arrow B) and the fuel cell stack 10 is thereby subjected to an impact load, since the tabs 60 are engaged with the recess 72 of the support bar 70, lateral displacement of the power generation cells 12 is prevented.

In this regard, when the impact load in the direction indicated by the arrow B is applied to the fuel cell stack 10, the support bar 70 receives larger stress from the plurality of power generation cells 12 located at the central portion of the stack body 14 in the stacking direction, than from the power generation cells 12 located at both ends of the stack body 14 in the stacking direction. In contrast, the support bar 70 according to the embodiment of the present invention has low rigidity since the central portion 70c of the support bar 70 in the extension direction in which the support bar extends (in the direction indicated by the arrow A) is narrowed or constricted by the width changing portion 94. Owing thereto, the support bar 70 is flexibly deformed easily so as to follow movement of the power generation cells 12 at the central portion in the stacking direction, and as a result, the stress received from the power generation cells 12 can be suitably distributed to the entire support bar 70 (i.e., the stress concentration on the central portion 70c can be reduced).

The fuel cell stack 10 according to the present invention is not limited to the above described embodiment. Various modifications may be made in line with the gist of the invention. For example, it is not essential that the tightening load is applied to the stack body 14 using the case body 20 and the end plates 24a, 24b. For example, the support bar 70 may be joined to each of the pair of end plates 24a, 24b (that is, the other end 70b of the support bar 70 also has fastening structure instead of support structure) to apply a tightening load to the stack body 14 using the support bar 70.

The technical concept and advantages understood from the above embodiment will be described below.

In the fuel cell stack 10, the width of the support bar 70 is decreased gradually from both ends (one end 70a, the other end 70b) toward the central portion 70c in the extension direction of the support bar 70. In the structure, the rigidity of the support bar 70 is gradually decreased from both ends toward the central portion 70c in the extension direction. As a result, the support bar 70 can be deformed easily at and near the central portion 70c. Thus, when the fuel cell stack 10 receives an impact load, since deformation of the central portion 70c of the support bar 70 easily follows movement of the power generation cells 12 at and around the center of the stack body 14 in the stacking direction, it becomes possible to reduce stress concentration on the central portion 70c of the support bar 70, and receive the impact load even more suitably. Further, since weight reduction of the support bar 70 is achieved, it is possible to facilitate weight reduction of the fuel cell stack 10 as a whole.

Further, the tabs 60 protruding outward are provided on the outer peripheral portions 33, 35 of the separators 30, and the support bar 70 includes the recess 72 on its surface facing the separators 30. The recess 72 can accommodate the tabs 60. As described above, since the support bar 70 accommodates the tabs 60 in the recess 72, the support bar 70 are firmly engaged with the outer peripheral portions 33, 35 of the separators 30. Therefore, it becomes possible to prevent or reduce lateral displacement of the separators 30 more reliably.

Further, the recess 72 continuously extends in the extension direction in which the support bar 70 extends, so as to have a constant shape. In the structure, since the width of the recess 72 does not change even if the width of the support bar 70 is decreased, it is possible to stably accommodate the tabs 60 while reducing the rigidity of the support bar 70 in the extension direction.

One support bar 70 is disposed on each of the upper side and the lower side of the outer peripheral portion 33, 35 of the rectangular separator 30. As described above, owing to the support bar 70 disposed on each of the upper side and the lower side, when the fuel cell automobile receives the impact load from the front side, the fuel cell stack 10 can suitably prevent or reduce lateral displacement of the power generation cells 12 on the upper and lower sides of the power generation cells 12. Further, since the number of support bars 70 installed therein is reduced, it is possible to facilitate weight reduction of the fuel cell stack 10 itself.

What is claimed is:

1. A fuel cell stack comprising:
    a stack body including a plurality of power generation cells stacked together in a stacking direction, the power generation cells respectively having separators;
    a pair of end plates provided at both ends of the stack body in the stacking direction; and
    a support bar extending between the pair of end plates in the stacking direction and configured to engage with an outer peripheral portion of each of the separators,
    wherein
    a width of the support bar is decreased gradually from a first end and a second end, each toward a central portion in the stacking direction in which the support bar extends,
    the support bar is formed of a bottom and a pair of side portions protruding from sides of the bottom toward the separators, and the bottom and the pair of side portions form a recess,
    each side portion of the pair of side portions has an inner surface forming the recess and an outer surface facing away from the recess,
    the outer surface comprises a first inclined surface and a second inclined surface that are inclined with respect to the stacking direction,
    the first inclined surface extends from the first end of the support bar toward the central portion, and is inclined inward along a width direction of the support bar, and
    the second inclined surface extends from the second end of the support bar toward the central portion, and is inclined inward along the width direction of the support bar.

2. The fuel cell stack according to claim 1, wherein
    a tab protruding outward is provided on the outer peripheral portion of each of the separators; and
    the recess faces the separators, the recess being configured to accommodate the tab therein.

3. The fuel cell stack according to claim 2, wherein the recess continuously extends in the stacking direction, so as to have a constant shape.

4. The fuel cell stack according to claim 1, wherein
    the support bar is provided on an upper side of the outer peripheral portion of each of the separators having a rectangular shape, and
    a second support bar is provided on a lower side of the outer peripheral portion of each of the separators.

* * * * *